Oct. 7, 1930.  E. HOPKINSON  1,777,309

SHATTERPROOF TRANSPARENT MATERIAL

Filed Sept. 16, 1927

Fig. 1.

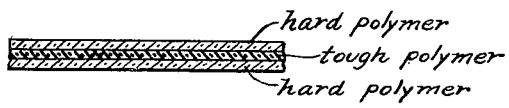

hard polymer
tough polymer
hard polymer

Fig. 2.

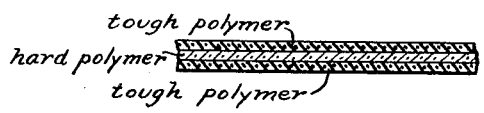

tough polymer
hard polymer
tough polymer

Fig. 3.

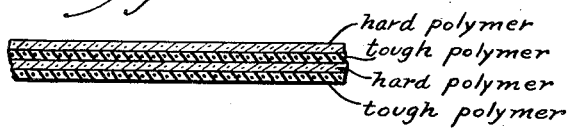

hard polymer
tough polymer
hard polymer
tough polymer

Fig. 4.

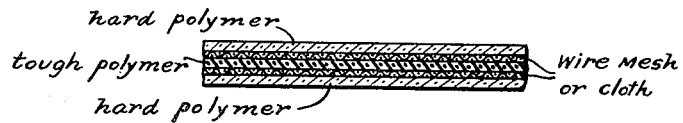

hard polymer
tough polymer
hard polymer
wire mesh or cloth

Fig. 5.

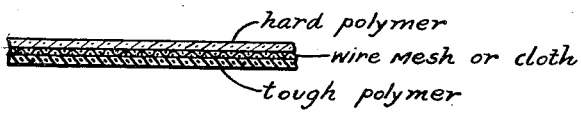

hard polymer
wire mesh or cloth
tough polymer

Fig. 6.

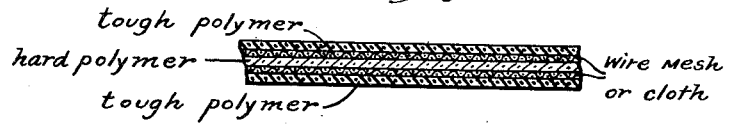

tough polymer
hard polymer
tough polymer
wire mesh or cloth

INVENTOR
Ernest Hopkinson
BY
ATTORNEY

Patented Oct. 7, 1930

1,777,309

UNITED STATES PATENT OFFICE

ERNEST HOPKINSON, OF NEW YORK, N. Y., ASSIGNOR TO THE NAUGATUCK CHEMICAL COMPANY, OF NAUGATUCK, CONNECTICUT, A CORPORATION OF CONNECTICUT

SHATTERPROOF TRANSPARENT MATERIAL

Application filed September 16, 1927. Serial No. 220,059.

In a great many of the manufacturing industries at the present time there is a demand for a glass or glass-like material which is capable of withstanding shock or blows or which when broken will not shatter into fragments. This is regarded as particularly important in the automobile industry in order to avoid injury from glass fragments in cases of collision or accident.

The present invention relates to a new type of shatter-proof transparent glass-like material suitable for use as automobile wind shields, windows, and any other glass articles the breakage of which is accompanied by a shattering and scattering of fragments.

Briefly stated the invention consists in forming a sheet material or an object from polymerized styrols of differing states of polymerization.

In the drawing Figures 1 to 3 illustrate in sectional views various arrangements of the layers of hard and tough styrol polymers, while Figures 4 to 6 illustrate the same used with reinforcing material.

To illustrate one embodiment of the invention, a sheet is formed of styrol polymerized to give a tough transparent product. This sheet may be formed by pressing the powdered polymer or fragments of the polymer in a heated press between polished plates. After the stratum of the tough transparent polymer has been formed and cooled, it is coated with a transparent polymer or styrol of a higher state of polymerization by applying a solution of the higher polymer. The solvent is then evaporated leaving a composite sheet having a high polish and a hard surface, due to the greater hardness of the higher polymer.

Instead of forming the central stratum by a pressing method, a sheet of the tough polymer may be formed by any other of the methods employed in the working of thermo plastic materials such as synthetic resins, casein or other products having molding or working temperatures near that of styrol, that is 100–180° C. The higher polymer may be applied in solution by painting, dipping or spraying methods, or may be made into sheets and plied with the tough polymer in any convenient way such as by heat and pressure.

The raw material, styrol or its homologues such as methyl styrol, ethyl styrol, etc., may be obtained in any of the known ways and polymerized according to any methods which will give a series of products of varying states of polymerization and toughness. For example, a 40% styrol solution may be heated for 72 hrs. at 110° C. to give the tough polymer. A brittle polymer may be made by heating a styrol solution for 40–45 hrs. at 140° C. Preferably, for the use of the material in wind shields, windows and the like the substantially water white transparent products are of course desired. It is, however, possible to color the tough product or the more highly polymerized product by incorporating a coloring material or dye therewith. Preferably the organic dyes are employed, particularly those which are soluble in the polymerized styrols, as this permits coloring the products without materially interfering with their transparency. The products herein described will take a high polish and have a brilliant lustre, and since they can be colored with a wide variety of delicate shades, the products may be used in applications other than as sheet materials for windows, windshields and the like.

It is within the scope of the invention to prepare the herein described laminated products with inserts of metal screening or, where the full measure of transparency is not required, an open mesh cloth insert, Figs. 4 to 6, or the equivalent of these.

For such articles as windshields the product is made with a high polish, although for other purposes where the same transparency is not required, the finish may be dull, frosted or matted. The product of the invention does not fly into fragments and splinters when broken. The product can be made in any desired thickness on account of its ready moldability and the arrangement of the layers or strata may be varied so that the harder polymer may be enclosed between strata of the tougher product or vice versa, Figs. 1 and 2, or the product may comprise a series of alternate strata of the polymers, Fig. 3.

Having thus described my invention, what I claim and desire to protect by Letters Patent is:

1. A method of manufacturing a shatter-proof glass-like product which consists in plying strata of polymerized styrols of differing states of polymerization, and uniting them into an integral article.

2. A method of manufacturing a shatter-proof glass-like product which consists in forming a stratum of a tough polymerized styrol, applying to the stratum a harder styrol of a higher state of polymerization, and integrally uniting the strata.

3. As a new product a shatter-proof glass-like material consisting of integrally united strata of styrols polymerized to different states.

4. As a new product a shatter-proof glass-like sheet material comprising a stratum of tough polymerized styrols and a coating of styrols of a higher state of polymerization than the tough polymer on the exterior surfaces of the sheet.

5. As a new product a shatter-proof glass-like material consisting of a stratum of tough transparent polymerized styrol having on each side an integral coat of a harder transparent styrol of a higher state of polymerization.

Signed at New York, New York, this 15th day of September, 1927.

ERNEST HOPKINSON.